Sept. 23, 1930.                J. KAMIDE                1,776,692
                           PROJECTING APPARATUS
                            Filed Oct. 3, 1927

INVENTOR.
Jutaro Kamide
BY
Langner, Parry, Card & Langner
ATTORNEYS

Patented Sept. 23, 1930

1,776,692

UNITED STATES PATENT OFFICE

JUTARO KAMIDE, OF KOBE, JAPAN

PROJECTING APPARATUS

Application filed October 3, 1927. Serial No. 223,780.

This invention relates to apparatus for use in connection with cinematograph lanterns or other like projectors, and has for its object to provide an apparatus capable of displaying pictures on a screen so that they are clearly visible in daylight on the side of the screen remote from the projecting apparatus itself, and so as to obtain uniform intensity of illumination for all angles of observation.

With an ordinary flat screen light from every point of the picture displayed on the screen does not fall on the eyes of the spectator with the same intensity, owing to the varying angles of observation. This uneven light intensity is appreciable especially when the screen is viewed from the lateral front seats, so that the eyes of the spectator are strained. My invention is designed to avoid this disadvantage by use of an outer screen with a straight vertical section and outwardly concave horizontal section the amount of curvature depending upon the shape of the space occupied by the spectators and the relative size of the screen.

It has already been proposed in such apparatus to provide an auxiliary plane or curved screen on the daylight side of the main screen on which the picture is projected so as to prevent access of extraneous light to the screen while allowing the picture to be viewed directly through the auxiliary screen.

Such an auxiliary screen would have no influence on the unequal intensity of light from different parts of the main screen, and the strain on the eyes of the spectators is in no way reduced thereby.

Figure 1:
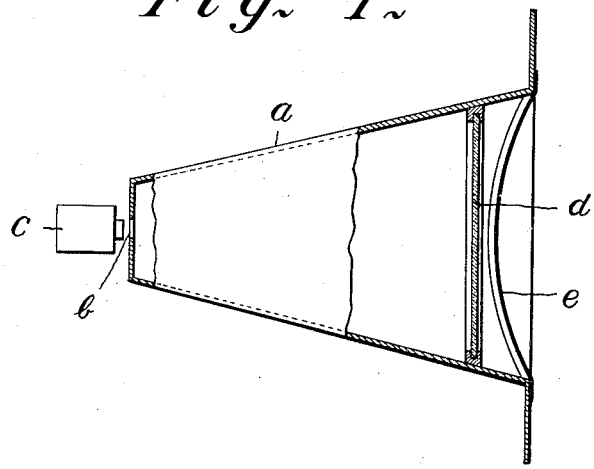

In the accompanying drawing, Figure 1 is a plan view partly in section of an apparatus embodying the invention.

Figure 2:
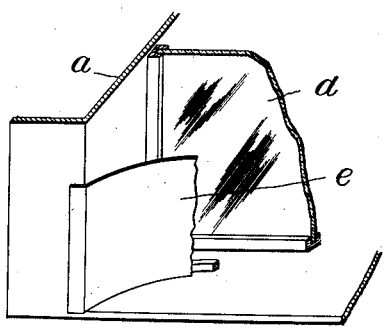

Figure 2 is a perspective fragmental view of an arrangement of the screens.

Referring to the drawing $a$ is a casing of pyramidal shape forming a dark chamber, the inside being blackened by suitable paint or the like, or lined with black fabric or the like. At the rear closed end of the casing an aperture $b$ is provided, through which the picture is projected from a projector $c$. Adjacent the front end of the casing an inner screen $d$ of frosted glass or the like is arranged, upon which the picture is projected directly from the projector. At the front end of the casing and spaced from the inner screen $d$ an outer screen $e$ of straight vertical section and outwardly concave horizontal section is arranged. The screen is made of suitable fabric such as silk gauze or the like and functions to screen the light transmitted through the inner screen and to permit the picture to be seen clearly therethrough. The curvature is provided with the object of producing a greater equality in the angles between the lines joining the observers to various points of the screen and the screen at those points, not only for a spectator favourably situated, but also for any spectator's position, and the curvature will be greater in proportion as the bulk of the spectators are nearer the screen. As a result of the use of such a curved screen, differences in intensity of illumination for different parts of the main screen due to the varying obliquity of direction of observation are considerably reduced.

Having now particularly described and ascertained the nature of my said invention and in what manner the same is to be performed, I declare that what I claim is:—

Apparatus for displaying optically projected image, comprising a casing forming a dark chamber and having an aperture at the rear closed end for the pasage of the light from an optical projector, a screen adjacent the front end thereof for displaying a picture and a further screen for screening the light transmitted through the first mentioned screen but permitting the picture to be viewed therethrough, the said further screen being of a straight vertical section and outwardly concave horizontal section.

In testimony whereof I have signed my name to this specification.

JUTARO KAMIDE.